United States Patent [19]

Kurimoto

[11] Patent Number: 4,908,170

[45] Date of Patent: Mar. 13, 1990

[54] METHOD OF PRODUCING AN ANNULAR FOAM PRODUCT

[75] Inventor: Kazunori Kurimoto, Konan, Japan

[73] Assignee: Tokai Chemical Industries, Ltd., Japan

[21] Appl. No.: 196,550

[22] Filed: May 20, 1988

[30] Foreign Application Priority Data

May 23, 1987 [JP] Japan .................................. 62-126177

[51] Int. Cl.⁴ ............................................. B29C 67/22
[52] U.S. Cl. .................................. 264/46.5; 264/46.6; 264/46.7; 264/46.9
[58] Field of Search ..................... 264/46.6, 46.7, 46.9, 264/46.5; 156/79, 91

[56] References Cited

U.S. PATENT DOCUMENTS

| | | | |
|---|---|---|---|
| 3,389,519 | 6/1968 | Williams et al. | 264/46.5 |
| 3,971,112 | 7/1976 | Amato et al. | 264/46.6 |

FOREIGN PATENT DOCUMENTS

| | | | |
|---|---|---|---|
| 58-012735 | 1/1983 | Japan | 264/46.6 |
| 60-024906 | 2/1985 | Japan | 264/46.7 |
| 60-024918 | 2/1985 | Japan | 264/46.7 |
| 60-105505 | 6/1985 | Japan | 264/46.6 |
| 60-105506 | 6/1985 | Japan | 264/46.6 |

Primary Examiner—Jan H. Silbaugh
Assistant Examiner—Allan R. Kuhns
Attorney, Agent, or Firm—Oliff & Berridge

[57] ABSTRACT

A method of producing an annular foam product having a foam filler covered by a tubular skin. A core embedded in the filler includes a connecting portion and a U-shaped portion which form an annular frame. Opposite edges of each of at least one skin member are joined together to form a U-shaped skin tube surrounding the U-shaped portion, such that the joined edges are located inside of the U-shaped skin tube. A skin sheet is jointed at opposite ends to corresponding opposite ends of the U-shaped skin tube so as to surround the connecting portion, while the end portions of the skin sheet are turned outside in. The end portions of the skin sheet are then turned over to expose its nominal outside outwardly, and opposite edges of the skin sheet along the connecting portion are joined together to form a connecting skin tube which surrounds the connecting portion of the annular frame. The U-shaped skin tube and the connecting skin tube constitute the tubular skin which encloses the annular frame. A foamable material is injected into the cavity formed between the tubular skin and the annular frame.

6 Claims, 4 Drawing Sheets

METHOD OF PRODUCING AN ANNULAR FOAM PRODUCT

BACKGROUND OF THE INVENTION

1. Field of the Invention

The present invention relates generally to a method of manufacturing a foam article having an outer surface covered by a suitable skin member, and more particularly to a method suitable for producing a head rest or head restraint for an automotive vehicle, which has an annular construction.

2. Discussion of the Prior Art

In the art of designing a head rest or head restraint for motor vehicles, which is a foam product whose outer surface is covered by a suitable skin film or tube, there is an increasing tendency of providing an opening in a central portion of the foam mass of the head rest body, thereby causing the head rest to have an annular configuration. In the manufacture of this type of head rest, there has been an attempt to enhance the appearance and quality of the head rest, by covering the outer surface of the foam body with a tubular or toroidal skin or bag. This tubular skin is formed of skin members of a suitable material, such as fabric members or synthetic leather members, that can be sewn, fusion-welded or otherwise joined into a tube or bag.

On the other hand, the head rest having an annular construction with a central opening requires a relatively rigid, annular core structure embedded therein, for the purpose of reinforcing the foam body and attaching the head rest to a seat of a vehicle. In the presence of this annular core structure, known methods of manufacture used for a conventional non-annular head rest are not suitably applicable to the manufacture of the annular head rest which uses the above-indicated skin members for the tubular skin. That is, the practice of the known methods for the annular head rest results in a significantly deteriorated appearance of the head rest, and a loss of high-quality feel of the head rest, for the following reasons.

Described more particularly, an example of the known methods wherein a non-annular head rest is produced by using skin members which are joined together into a skin bag, includes the steps of: preparing the tubular skin having an unjoined portion corresponding to the lower side of the head rest, by joining together the skin members with their nominal insides exposed outwardly of the obtained skin bag; inserting a suitable core structure into the prepared skin bag through the unjoined portion of the skin bag; closing the unjoined portion of the skin bag so as to completely enclose the core structure inserted therein; injecting an appropriate foamable material into a cavity or space formed between the skin bag and the core structure. Thus, the cavity is filled with the foam body formed of the injected material. If this known method conventionally used to produce the non-annular head rest is applied to the manufacture of the annular head rest, it is required that the skin members be left unjoined at the entire inner periphery of a tubular skin defining the central opening of the head rest, in order to permit the core structure to be inserted through the unjoined portion into the tubular skin or bag. Therefore, it is necessary to join the unjoined portions of the skin members, on the outer surface of the tubular skin after the core structure is set in the tubular skin. Thus, it is unavoidable that the seams or joined portions or edges of the skin members are exposed on the inner periphery of the tubular or toroidal skin which defines the central opening of the head rest. For this reason, the appearance and high-quality feel or image of the produced head rest are considerably deteriorated.

A solution to obviate the above problem with the conventional method for manufacturing a foam product is disclosed in laid-open Publication No. 62-35811 of Japanese Patent Application, wherein two joining plates are disposed along mating portions of the skin members, such that the two joining plates pinch the mating portions of the skin members therebetween, thereby joining the mating portions. Although this method disclosed in the above Publication is capable of producing an annular head rest having an improved appearance and an excellent high-quality feel, the use of the joining plates pushes up the cost of manufacture, and reduces the soft cushioning property of the head rest during its use.

SUMMARY OF THE INVENTION

It is therefore an object of the present invention to provide a method of economically producing an annular foam product which has an enhanced appearance and an excellent operating property.

The above object can be accomplished according to the principle of the present invention, which provides a method of producing an annular foam product having a core structure and a tubular skin, the core structure including a connecting portion and a generally U-shaped portion which cooperate with each other to form an annular frame, the tubular skin being formed by joining sheet members so as to form an annular tube which then encloses the annular frame of the core structure, such that a cavity is formed between the tubular skin and the annular frame, the method comprising the steps of: placing at least one skin member so as to surround the U-shaped portion of the annular frame of the core structure; joining together opposite edges of each of the above-indicated at least one skin member, so as to form a U-shaped skin tube surrounding the U-shaped portion, such that the joined edges are located inside of the U-shaped skin tube; joining each of opposite ends of a skin sheet to a corresponding one of opposite ends of the U-shaped skin tube while end portions of said skin sheet including the opposite ends thereof are turned inside out; turning over the above-indicated end portions of the skin sheet such that a nominal inside thereof is on the side of the connecting portion of the annular frame, and placing the skin sheet so as to surround the connecting portion; joining together opposite edges of the skin sheet along the connecting portion, thereby forming a connecting skin tube which surrounds the connecting portion of the annular frame, the U-shaped skin tube and the connecting skin tube cooperating with each other to constitute the tubular skin in the form of the annular tube which encloses the annular frame of the core structure; and injecting a foamable material into the cavity formed between the tubular skin and the annular frame, and filling the cavity with a foam filler formed by the injected foamable material.

Where the instant method is used to produce a head rest having an annular configuration using a tubular skin which is formed by sheet members that are made of a woven fabric, synthetic leather or similar material, all joined portions of the tubular skin (annular skin tube)

except for the joined portion on the lower side of the head rest lie inside of the annular skin tube. Consequently, the annular head rest produced according to the instant method has an enhanced appearance and gives an excellent high-quality feel. While the joined portion on the lower side of the head rest is exposed, its influence on the appearance of the head rest is not considerable since this lower side of the head rest faces downward.

According to the instant method, all the joined portions of the annular skin tube which are eventually located inside of the tube can be obtained easily and economically, by sewing, fusion-welding or similar simple method. Described differently, the instant method does not require conventionally used joining plates as described above. In the absence of the joining plates, the head rest produced by the instant method has an improved operating characteristic (soft cushioning property).

While the present invention was made in an effort to produce an improved annular head rest for an automotive vehicle, the practice of the present method is not limited to the manufacture of the head rest, but the principle of the invention is applicable to other foam products which have an annular structure with a central opening formed therein.

In one form of the method of the present invention, the above-indicated at least one skin member consists of a plurality of skin members which are joined together end to end to form the U-shaped skin tube such that the skin members surround the respective parts of U-shaped portion of the annular frame of the core structure, and such that the joined ends of the skin members are located inside of the U-shaped skin tube. In the case where the annular frame of the core structure has a substantially rectangular shape such that the U-shaped portion provides three sides of the rectangular shape of the annular frame while the connecting portion provides the remaining one side of the rectangular shape, the skin members consist of three skin members which surround the three sides of the rectangular shape.

In another form of the present invention, the skin sheet is formed by joining together corresponding edges of two skin members before the skin sheet is placed so as to surround the connecting portion of the annular frame of the core structure.

In a further form of the invention, wherein the opposite edges of the skin sheet along the connecting portion of the annular frame are joined together, except for a portion which defines a nozzle inlet through which an injection nozzle is inserted into the cavity for injecting the foamable material into the cavity. In this case, the opposite edges of the skin sheet joined along the connecting portion of the annular frame may be pinched by spring means disposed along the opposite edges, so that the nozzle inlet is closed by the spring means after the injection nozzle is removed.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
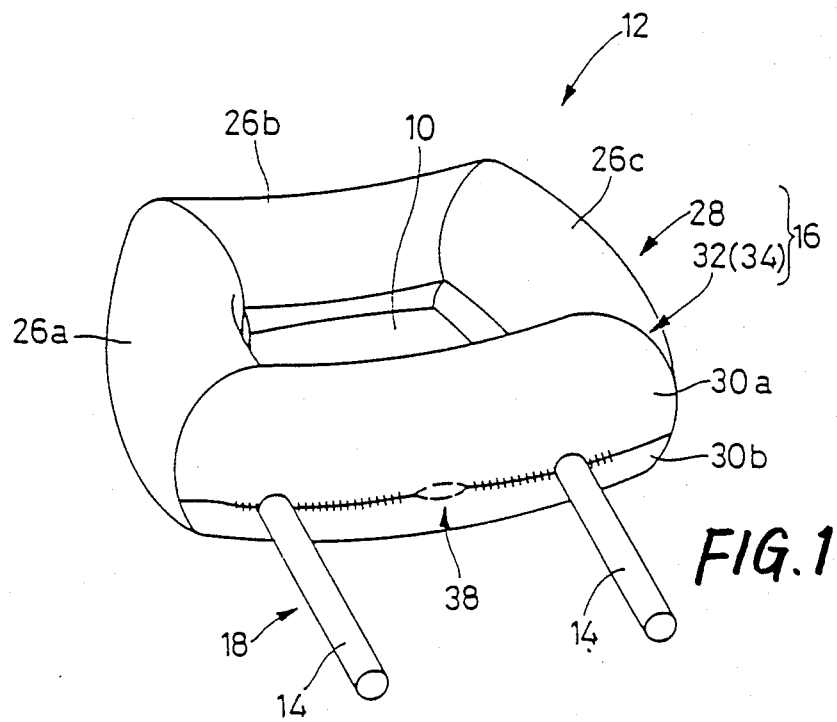
FIG. 1 is a perspective view of an example of a head rest produced by a method according to one embodiment of the present invention.

Referring first to FIG. 1, there is shown a foam product in the form of a head rest used for an automotive vehicle, which is manufactured by the method according to the presently preferred embodiment of the present invention. As shown in the figure, the head rest manufactured according to the instant method consists of a body 12 having an annular configuration of a generally rectangular shape, and a pair of parallel stays 14, 14 which extend from one side (lower side) of the rectangular outer periphery of the body 12. The head rest body 12 has a central opening 10, and the stays 14, 14 are spaced apart from each other by a suitable distance in the direction parallel to the above-identified one side. The head rest is attached at the stays 14 to a seat of the vehicle. As described below in detail, the body 12 of the head rest is formed such that a tubular or toroidal skin 16 is filled with a suitable foam mass or filler such as a poly-urethane foam filler. As described below in greater detail, the tubular skin 16 is formed by joining a plurality of sheet members (first skin members 26a, 26b, 26c, and second skin members 30a, 30b, which will be described) which are made of a suitable material that can be sewn, such as a woven fabric. The skin members 26, 30 are internally lined with a cushioning layer having a suitable thickness. The head rest body 12 has a substantially rectangular annular frame 20 embedded in the central portion of the foam filler, as shown in FIG. 2.

The annular frame 20 cooperates with the pair of stays 14, 14 to constitute a core structure 18. Namely, the stays 14 are connected to the annular frame 20 such that the stays extend from one side of the rectangle of the annular frame 20 corresponding to the above-indicated one side of the head rest body 12. The annular frame 20 of the core structure 18 consists of a generally U-shaped portion 24, and a connecting portion 22 which connects the opposite ends of the U-shaped portion 24, as indicated in FIG. 2. The stays 14, 14 are connected to the opposite ends of the connecting portion 22.

Figure 2:
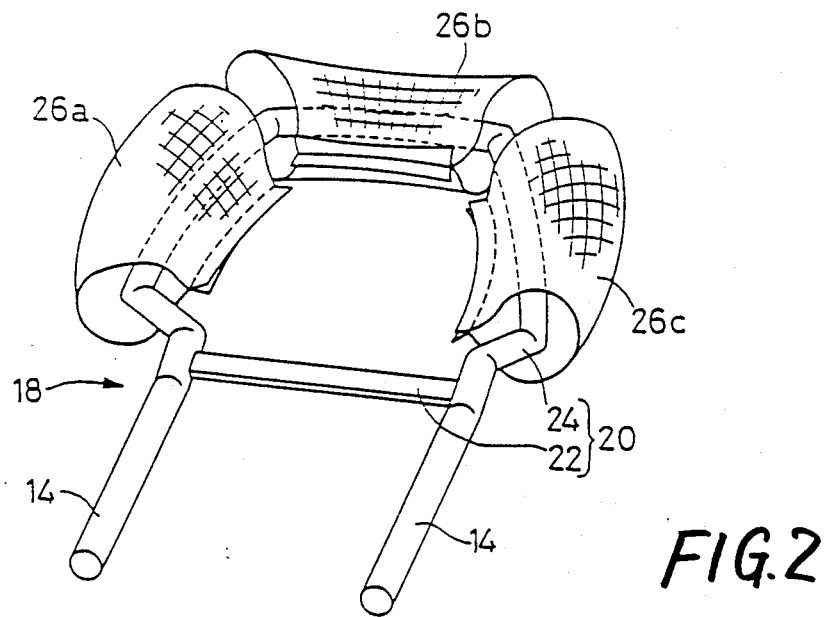
FIGS. 2–9 are explanatory views illustrating the method of producing the head rest shown in FIG. 1.

The head rest constructed as described above is produced in the following manner:

Initially, the suitably cut three first skin members 26a, 26b, 26c which correspond to the three sides of the U-shaped portion 24 of the rectangular annular frame 20 of the core structure 18 are placed so as to surround the corresponding three parts of the U-shaped portion 24 of the annular frame 20, such that the nominal outside of each skin member 26a, 26b, 26c is on the side of the U-shaped portion 24, while the nominal inside (lined with the cushioning layer) is exposed, as shown in FIG. 2. The opposite edges of each first skin member 26 are overlapped and sewn together such that the skin member forms a tubular shape through which the U-shaped portion 24 extends. The obtained tubular skin members 26a 26b, 26c are sewn together end to end in the following manner, whereby a U-shaped skin tube 28 surrounding the U-shaped portion 24 of the core structure 18 is prepared.

Figure 3:
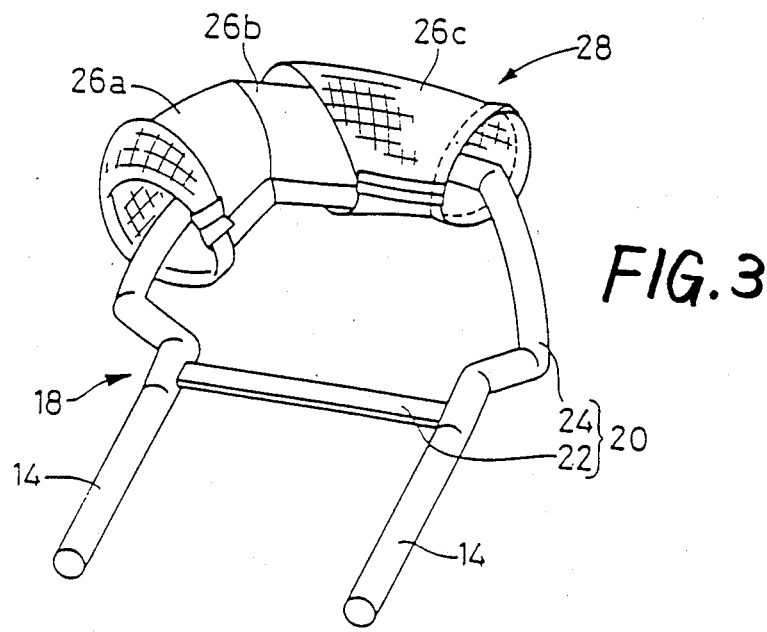
Figure 4:
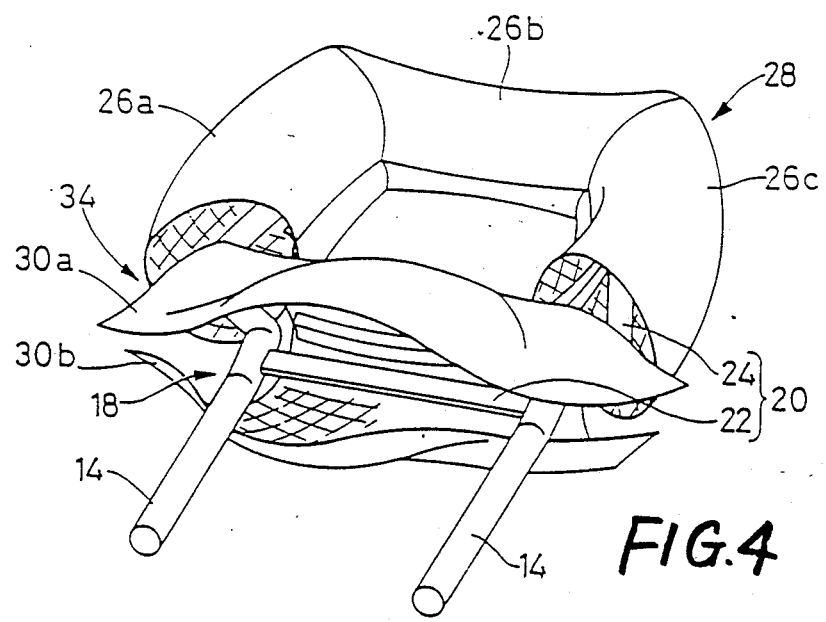

Described more specifically for illustrative purpose only, the intermediate tubular skin member 26b is turned over such that the nominal inside is located inside of the tube of the skin member 26b. The tubular skin member 26a is moved to be superposed on the tubular skin member 26b such that the nominal outer surfaces of the two skin members 26a, 26b face each other. Then, the corresponding ends of the tubes of the two skin members 26a, 26b are sewn together, and the tubular skin member 26a is turned such that its nominal outside is exposed (its nominal inside is on the side of the annular frame 20), as indicated in FIG. 3. The tubular skin member 26c is sewn end to end to the intermediate skin member 26b, in the same manner as described above with respect to the skin member 26a as also indicated in FIG. 3. Then, the skin member 26c is turned to expose its nominal outside. Thus, the U-shaped skin tube 28 consisting of the three tubular skin members 26a, 26b, 26c is prepared as shown in FIG. 4. It is noted that all the sewn edges or ends of the skin members 26 are now located inside the U-shaped skin tube 28.

The U-shaped skin tube 28 may be prepared in an alternative way. For example, the three skin members 26a, 26b and 26c are sewn together edge to edge so as to prepare a single skin sheet. Then, this skin sheet is placed over the U-shaped portion 24 of the core structure 18, so as to surround the U-shaped portion 24 such that the nominal outside of the skin sheet is on the side of the U-shaped portion 24. The opposite edges of the thus formed skin sheet are overlapped and sewn together, whereby the U-shaped skin tube 28 is prepared. The prepared U-shaped skin tube 28 is turned such that the nominal inside is located inside of the tube.

After the U-shaped skin tube 28 is prepared, there are prepared a connecting skin tube 32 (FIG. 1) for covering the connecting portion 22 of the core structure 18, and the tubular skin 16 (FIG. 1) covering the entire annular frame 20 of the core strucute 18. The connecting skin tube 32 is prepared in the following manner, from second skin members 30a and 30b which correspond to the front and rear sides of the head rest body 12.

To prepare the connecting skin tube 32, the edges of the two second skin members 30a, 30b which form the inner periphery of the tubular skin 16 partially defining the central opening 10 are sewn together to prepare a single sheet member in the form of a skin sheet 34. This skin sheet 34 consisting of the two second skin members 30a, 30b is used for enhancing the design of the tubular skin 16. Namely, the sewn skin members 30a, 30b of the skin sheet 34 provide a seam line on one side of the inner periphery of the tubular skin 16, which seam line forms a looped seam line, in cooperation with the seam lines of the three first skin members 26a, 26b, 26c provided on the other three sides of the inner periphery of the tubular skin 16. It will be understood that the skin sheet 34 may consists of a single cut sheet without a seam.

Figure 5:
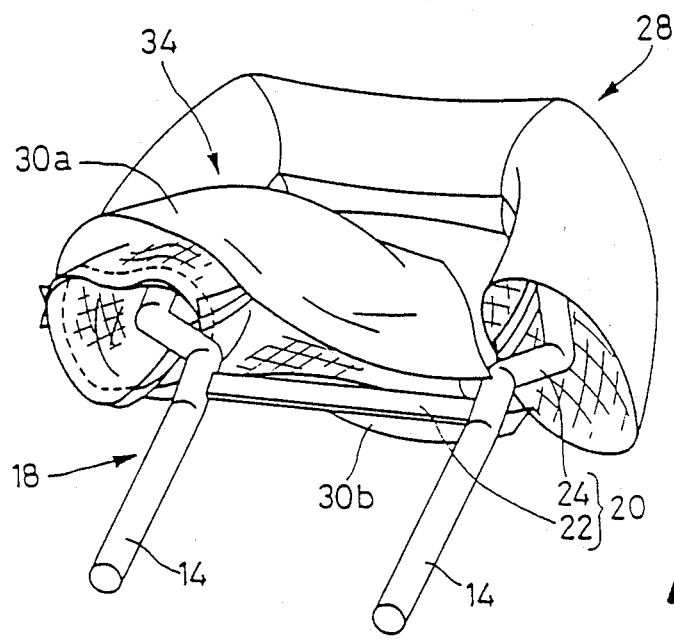
Figure 6:
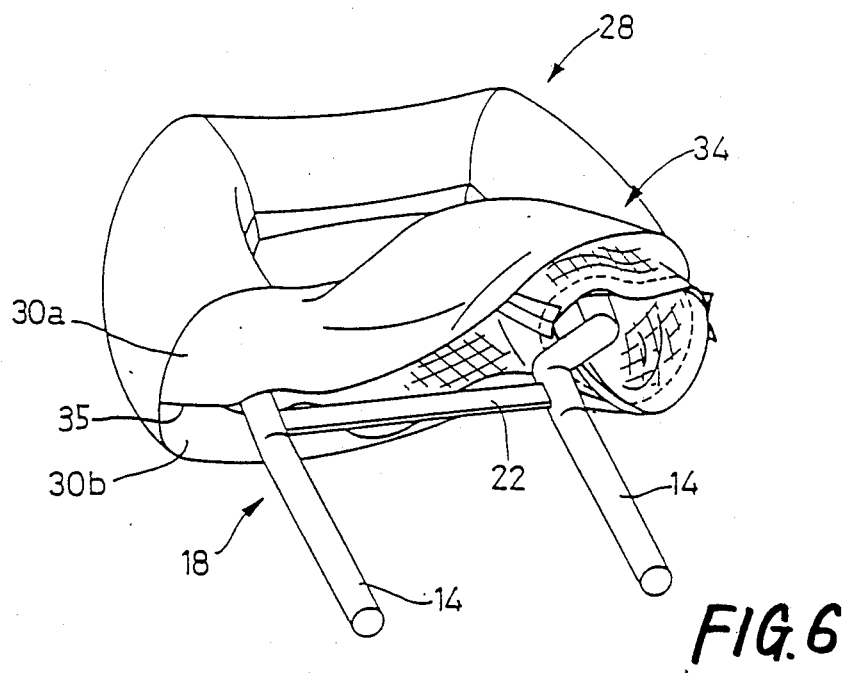
Figure 7:
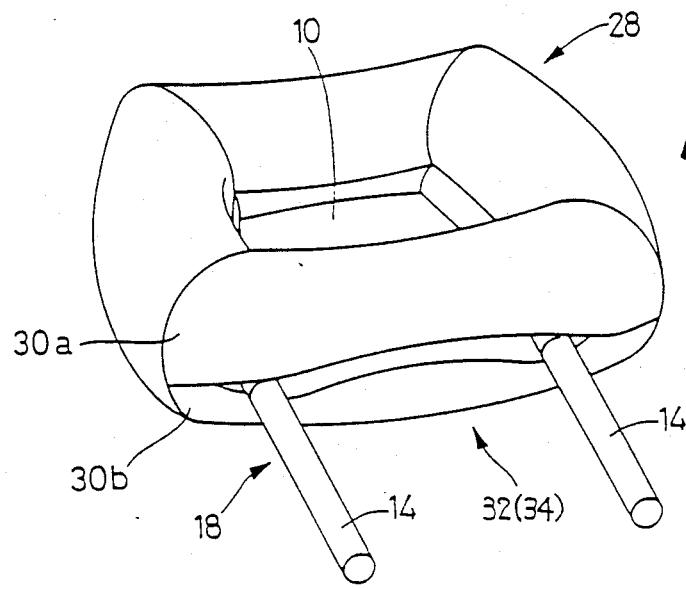

The prepared skin sheet 34 is placed so as to cover the connecting portion 22 of the core structure 18 as shown in FIG. 4. Then, one end portion of the skin sheet 34 is overlapped with one end portion of the U-shaped skin tube 28 (open end of the tubular skin member 26a), as shown in FIG. 5, and the overlapped end portions are sewn together. It is desirable that the end portion of the unsewn edges of the second skin members 30a, 30b which is adjacent to the sewn end of the skin sheet 34 and through which the corresponding stay 14 extends outwardly, be sewn as indicated at 35 in FIG. 6, at the time the above-indicated corresponding ends of the sheet 34 and the skin tube 28 are sewn together.

After the skin sheet 34 is sewn to the above-indicated one end of the U-shaped skin tube 28 (tubular skin member 26a), the skin sheet 34 is sewn to the other end of the skin tube 28 (tubular skin member 26c), in the same manner as described above. Then, the skin sheet 34 is brought to its nominal position, namely, their end portions are turned so as to expose the nominal outside, so that the seams are located inside of the connecting skin tube 32 which covers the connecting portion 22 of the core structure 18. The still unsewn edges of the skin sheet 34 between the two stays 14, 14 are sewn together, except for a portion that defines a nozzle inlet 38 (FIG. 1) for inserting an injection nozzle 42 for injecting a foamable material 36 into the cavity formed within the tubular skin 16, as described below by reference to FIGS. 8 and 9.

According to the above-described method of preparing the tubular skin 16, the seams of the U-shaped skin tube 28 (first skin members 26) and connecting skin tube 32 (second skin members 30) including the seams between the stays 14 and the connections of the U-shaped and connecting portions 28, 32, are all located within the generally rectangular tubular skin 16, and are not seen. The only seam which is exposed on the outer surface of the head rest body 12 is formed between the stays 14, 14, on the bottom side of the rectangle of the body 12, as indicated in FIG. 1.

Figure 8:
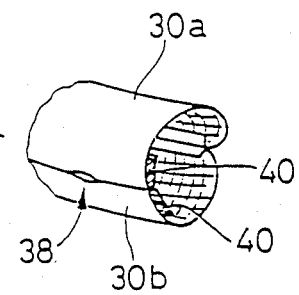

The above-indicated finally sewn edges of the skin sheet 34 on the outer periphery of the connecting skin tube 32 are nipped by a pair of spring members 40, 40 made of a suitable material such as a synthetic resin, as shown in FIG. 8. The spring members 40 permit insertion of the injection nozzle 42 into the nozzle inlet 38 into the tubular skin 16, for filling the cavity in the skin 16 with the foamable material 36, as described below. Further, the spring members 40 function to close the nozzle inlet 38 due to its elastic force, after the injection nozzle 42 is removed. Thus, the spring members 40 effectively prevent leakage of the injected foamable material 36 from the tubular skin 16 through the nozzle inlet 38.

Figure 9:
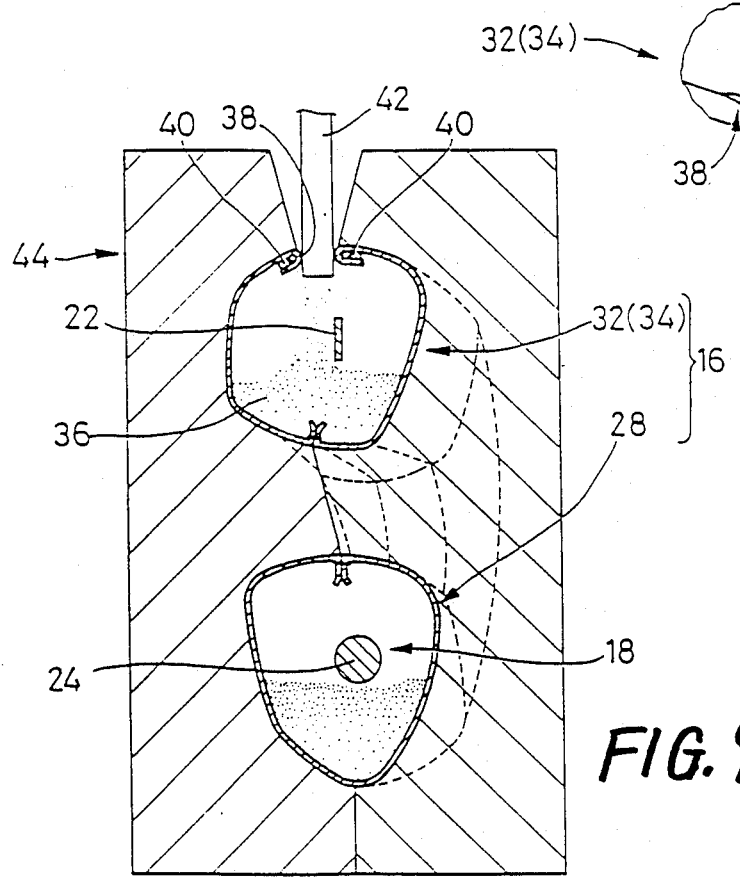

After the tubular skin 16 is formed in the manner described above, the tubular skin 16 and the core structure 18 are set in an appropriate mold 44, and the injection nozzle 42 is inserted into the tubular skin 16 through the nozzle inlet 38, as shown in FIG. 9. The foamable material 36 such as reaction mixture for a poly-urethane foam filler is injected into the cavity in the tubular skin 16, through the nozzle 42, whereby the cavity within the tubular skin 16 is filled with the foam filler. Thus, the head rest as shown in FIG. 1 is produced.

In the instant method of producing the annular head rest as described above, all of the seams or sewn edges of the first and second skin members 26a, 26b, 26c, 30a, 30b, except for the seam on the outer periphery of the connecting skin tube 32, lie inside the tubular skin 16 and do not degrade the appearance of the head rest. In other words, the instant method permits the production of a head rest which provides refined appearance and design.

It will also be understood from the foregoing description that the joined portion of the tubular skin 16 of the head rest produced according to the instant method do not contain a material other than the foam product, except for the synthetic resin spring members 40 disposed along the seam on the lower side of the body 12. Consequently, the head rest as a whole gives an extremely soft feel during use, and is economical to manufacture, as compared with a head rest manufactured according to a method disclosed in laid-open Publication No. 62-35811 of Japanese unexamined Patent Application.

In the illustrated embodiment, the skin sheet 34 is sewn to the opposite ends of the U-shaped skin tube 28 after the skin tube 28 is prepared from the first skin members 26a, 26b, 26c. However, the skin sheet 34 may be sewn at its one end to the corresponding end of the skin tube 28 when the skin tube 28 is prepared. For instance, the sheet 34 is sewn to the skin member 26a before the skin members 26a, 26b, 26c are sewn to each other to form the skin tube 28.

The illustrated embodiment uses the nozzle inlet 38 which is adapted to be closed by the spring members 40, 40 disposed along the lower side of the head rest body 12, in order to avoid leakage of the injected foamable material 36 during and after the injection of the material into the tubular skin 16. However, it is possible to employ other structures for the nozzle inlet, as disclosed in Japanese Patent Applications Nos. 61-136754, 61-136755 and 61-197175. Further, the edges of the skin sheet 34 (between the stays 14) on the lower periphery of the body 12 may be joined together by engaging means as disclosed in laid-open Publication No. 62-35811 of Japanese unexamined Patent Application.

While the core structure 18 of the illustrated head rest is not provided with a mechanism for adjusting its operating position (operating level and inclination angle), the core structure 18 may be modified so as to incorporate such a mechanism.

Although the illustrated method uses the skin members 26 and 30 each of which is a woven fabric or similar material internally lined with a cushioning layer, the tubular skin 16 may be formed from other materials which can be joined together by fusion or other methods, other than sewing or stitching.

In the head rest manufactured by the illustrated embodiment, the pair of stays 14, 14 extend from the annular frame 20 of the core structure 18. The head rest may include only one stay or three or more stays extending from the annular frame 20. Further, the principle of the present invention is applicable to a head rest which has no such stays or legs. Also, the invention is applicable to the manufacture of foam products or articles other than the head rest.

While the present invention has been described in its presently preferred embodiment with a certain degree of particularity, it is to be understood that the invention is not confined to the precise details of the illustrated embodiment, but various changes, modifications and improvements may be made in the invention, without departing from the spirit and scope of the invention defined in appended claims.

What is claimed is:

1. A method of producing an annular foam product having a core structure and a tubular skin, said core structure including a connecting portion and a generally U-shaped portion which cooperate with each other to form an annular frame, said tubular skin being formed by joining sheet members to form an annular tube which encloses said annular frame of said core structure, such that a cavity is formed between said tubular skin and said annular frame, said method comprising the steps of:

placing a plurality of skin members so as to surround respective parts of said U-shaped portion of said annular frame of said core structure, such that a nominal inside of each said skin member is exposed;

joining together opposite edges of each of said plurality of skin members, so as to form tubular skin members, such that the joined edges of each said skin member are located outside of said tubular skin members;

joining together the tubular skin members end to end to form a U-shaped skin tube, by (a) turning over one of the adjacent tubular skin members to expose a nominal outside thereof, (b) superposing the other of said adjacent tubular skin members on said one tubular skin member such that nominal outer surfaces of said adjacent tubular skin members face each other, (c) joining one end of said one tubular skin member to a corresponding one end of said other tubular skin member, and (d) turning over said other tubular skin member to expose a nominal outside thereof, said U-shaped skin tube surrounding said U-shaped portion of said annular frame;

joining each of opposite ends of a skin sheet to a corresponding one of opposite ends of said U-shaped skin tube while end portions of said skin sheet including said opposite ends thereof are turned inside out;

turning over said end portions of said skin sheet such that a nominal inside thereof is on the side of said connecting portion of said annular frame, and arranging said skin sheet to surround said connecting portion;

joining together opposite edges of said skin sheet along said connecting portion, thereby forming a connecting skin tube which surrounds said connecting portion of said annular frame, said U-shaped skin tube and said connecting skin tube cooperating with each other to constitute said tubular skin in the form of said annular tube which encloses said annular frame of said core structure to form a cavity; and injecting a foamable material into said cavity formed between said tubular skin and said annular frame, and filling said cavity with a foam filler formed by the injected foamable material.

2. A method according to claim 1, wherein said annular frame of said core structure has a substantially rectangular shape such that said U-shaped portion provides three sides of the rectangular shape of said annular frame while said connecting portion provides the other one side of said rectangular shape, said plurality of skin members consist of three skin members which surround said three sides of said rectangular shape.

3. A method according to claim 1, wherein said skin sheet is formed by joining together corresponding edges of two skin members before said skin sheet is placed so as to surround said connecting portion of said annular frame of said core structure.

4. A method according to claim 1, wherein said opposite edges of said skin sheet along said connecting portion of said annular frame are joined together, except for a portion which defines a nozzle inlet through which an injection nozzle is inserted into said cavity for injecting said foamable material into said cavity.

5. A method according to claim 1, wherein said opposite edges of said skin sheet joined along said connecting portion are pinched by spring means disposed along said opposite edges, so that said nozzle inlet is closed by said spring means after said injection nozzle is removed.

6. A method of producing an annular foam product having a core structure and a tubular skin, said core structure including a connecting portion and a generally U-shaped portion which cooperate with each other to form an annular frame, said tubular skin being formed by joining sheet members to form an annular tube which encloses said annular frame of said core structure, such that a cavity is formed between said tubular skin and said annular frame, said method comprising the steps of:

joining together a plurality of skin members edge to edge to prepare a single first skin sheet;

placing said single first skin sheet over said U-shaped portion of said annular frame of said core structure, so as to surround said U-shaped portion such that a nominal outside of said first skin sheet faces said U-shaped portion;

joining together opposite edges of said first skin sheet to form a U-shaped skin tube which surrounds said U-shaped portion of said annular frame;

turning over said U-shaped skin tube such that a nominal inside thereof is located inside of said U-shaped skin tube;

joining each of opposite ends of a second skin sheet to a corresponding one of opposite ends of said U-shaped skin tube while end portions of said second skin sheet including said opposite ends thereof are turned inside out;

turning over said end portions of said second skin sheet such that a nominal inside thereof is on the side of said connecting portion of said annular frame, and arranging said second skin sheet to surround said connecting portion;

joining together opposite edges of said second skin sheet along said connecting portion, thereby forming a connecting skin tube which surrounds said connecting portion of said annular frame, said U-shaped skin tube and said connecting skin tube cooperating with each other to constitute said tubular skin in the form of said annular tube which encloses said annular frame of said core structure to form a cavity; and injecting a foamable material into said cavity formed between said tubular skin and said annular frame, and filling said cavity with a foam filler formed by the injected foamable material.

* * * * *